June 4, 1968
C. G. OLSON ET AL
3,386,661
SELF-PROPELLED SPRINKLING IRRIGATION APPARATUS
Filed Feb. 8, 1967
3 Sheets-Sheet 1
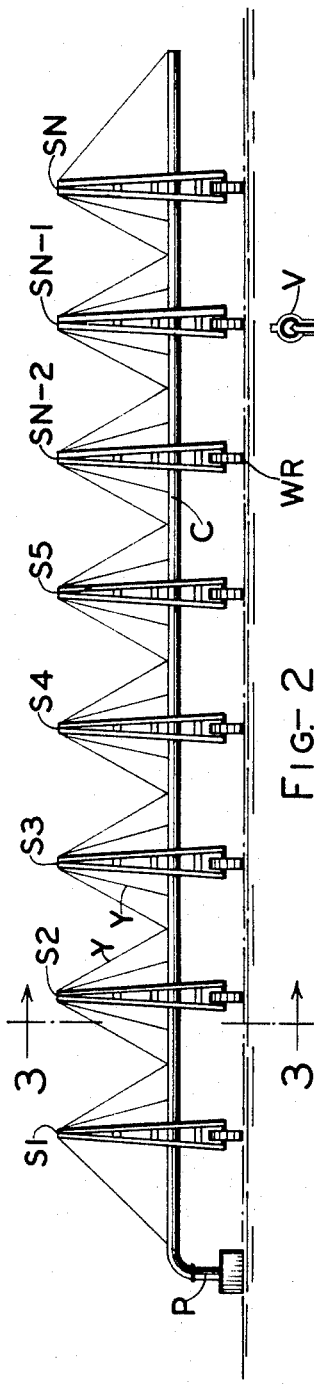
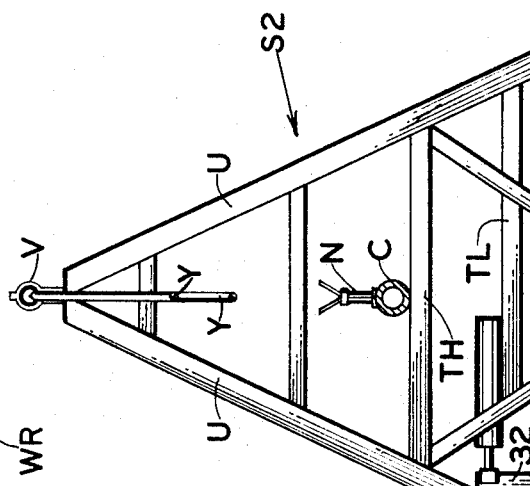
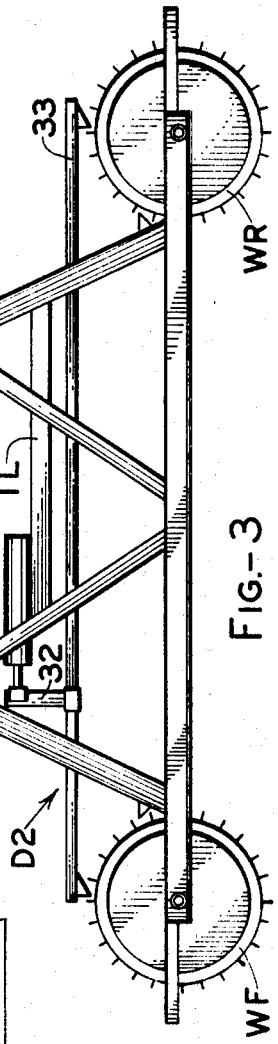
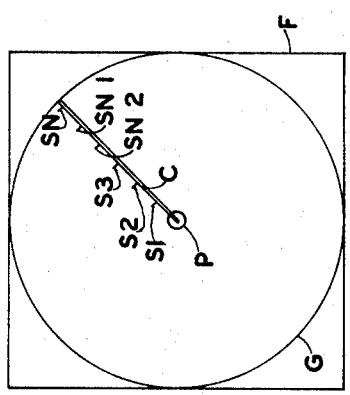
INVENTOR
CARROL G. OLSON &
THEODORE V. OLSON
BY *George R. Nimmer*
ATTORNEY

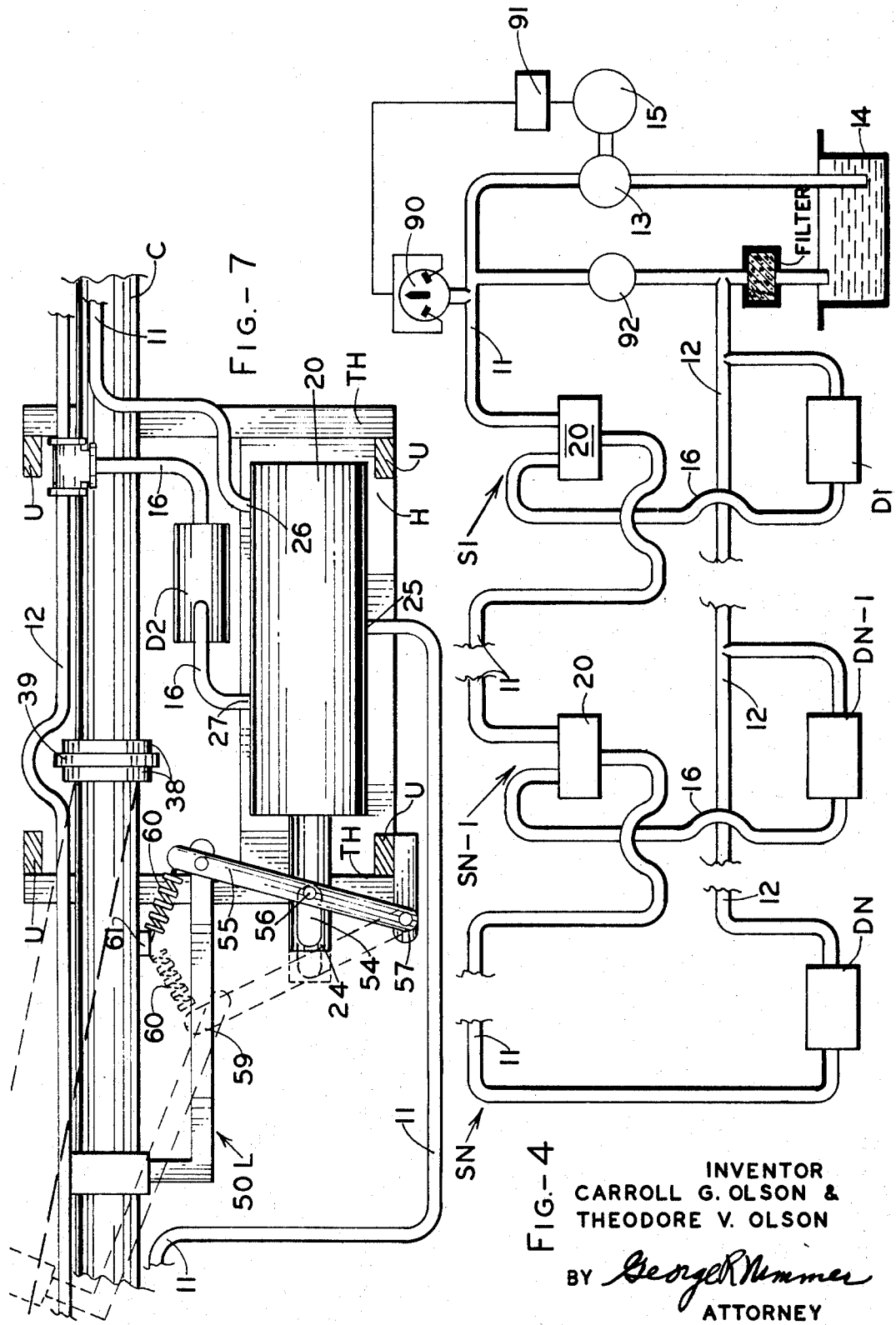

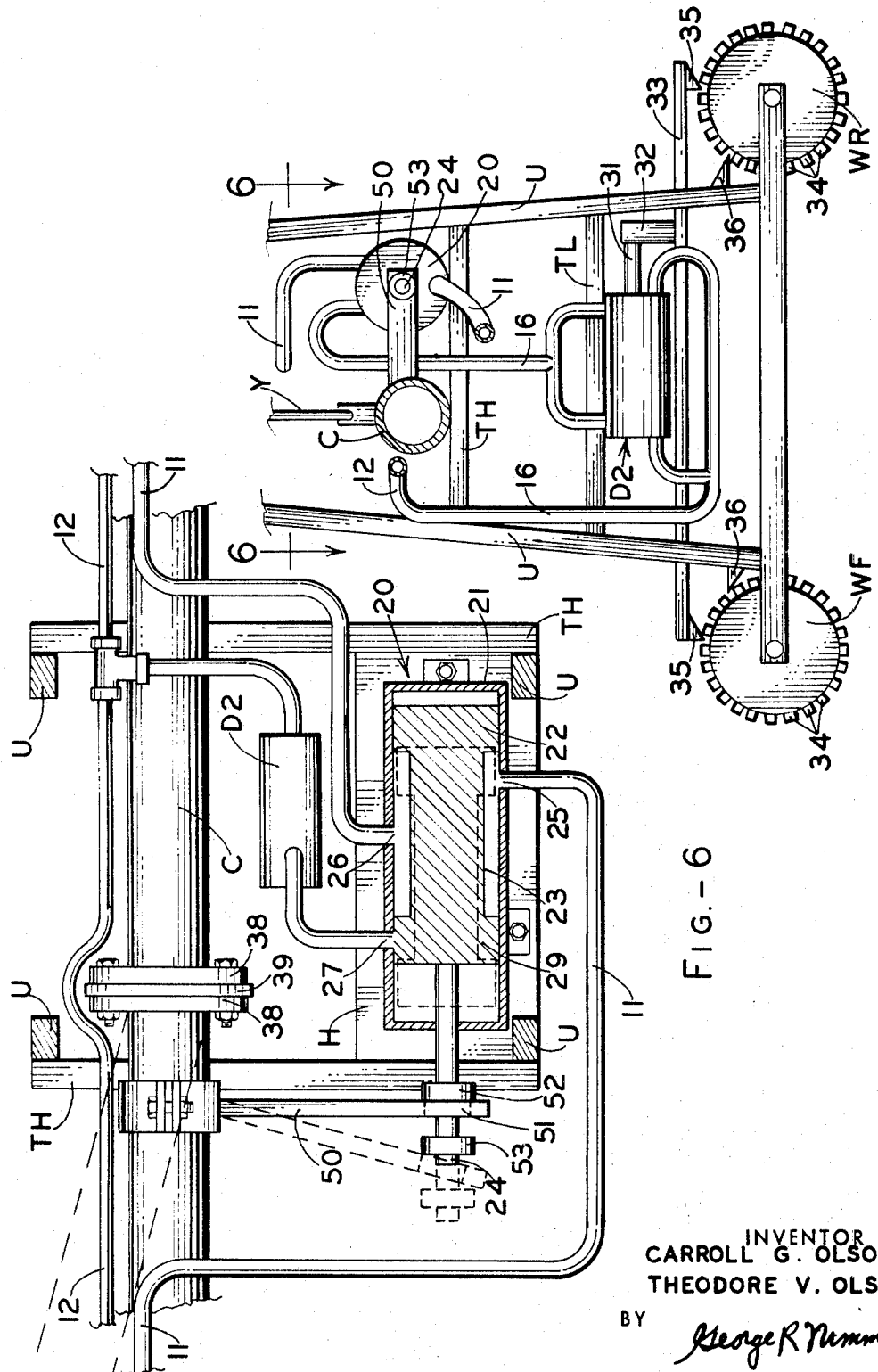

United States Patent Office 3,386,661
Patented June 4, 1968

3,386,661
SELF-PROPELLED SPRINKLING IRRIGATION
APPARATUS
Carroll G. Olson, Atkinson, Nebr. 68713, and Theodore
V. Olson, Spencer, Nebr. 68777
Filed Feb. 8, 1967, Ser. No. 614,733
10 Claims. (Cl. 239—177)

ABSTRACT OF THE DISCLOSURE

This invention relates to a self-propelled sprinkling irrigation apparatus comprising a relatively long water distributing conduit adapted to move around a central water supply pipe so as to spray water onto the land, said water distributing conduit being supported above the land in parallelism therewith by means of a plurality of spaced support members which are driven along the land laterally with respect to the conduit to cause the conduit to move around the central water supply pipe. In particular this invention provides an improved means for maintaining the alignment of the several support members as the elongate conduit moves around the central water supply pipe, and specifically, the alignment means is based upon a closed-circuit hydraulic system that is wholly external to and divorced from the water carried by the elongate conduit.

---

Self-propelled sprinkling irrigation apparatuses comprising an elongate water distributing conduit adapted to move around a central water supply pipe and the conduit being provided with a plurality of spaced apart driven supports have been described in numerous patents including U.S. 1,419,925, U.S. 2,604,359, and U.S. 2,893,643. The prior art also teaches the necessary means for maintaining the several spaced supports in substantial alignment during their propulsion of the elongate water distributing conduit in a circular path, such supports alignment means being necessary to prevent deformation, "jack-knifing," or even possible breaking of the elongate conduit. The supports alignment means of the prior art typically comprises at each of the several supports, means responsive to the springing or bending of the conduit, e.g. an arm extending laterally from the conduit, a valve to divert a portion of the water from the elongate conduit said valve being controlled by the responsive means, said diverted water being directed from the valve to a water-driven means for propelling the support along the land, and finally the diverted water portion is exhausted from the drive means to the environment. Thus, the alignment means of the prior art might be designated as "open-circuit" water-drive since water is taken from the irrigating water supply, then used to propel the support member drive means, and said diverted water is finally exhausted to the earth adjacent to a support member.

Self-propelled sprinkling irrigation apparatuses should also include a "safety-device" to ensure against deformation, "jack-knifing," or even possible breaking of the elongate conduit in the event that the supports alignment means does fail to function properly. Typically, the "safety means" has comprised an electrical circuit traversing the elongate length of the water-distributing conduit, and a series of electrical shut-off switches therealong associated with the means responsive to the springing or bending of the conduit; accordingly, when excessive springing or bending of the elongate conduit is encountered, the electrical circuit causes the entire irrigation apparatus to halt. The primary disadvantage of this prior art electrical "safety means" resides in the fact that the electrical apparatus must be employed adjacent to the potentially corrosive environment of the water-distributing conduit, said environment being inimical to the proper function of the "safety means." Further, with the slightest malfunction of an electrical "safety means" the whole irrigation apparatus immediately comes to a complete non-productive halt.

The open-circuit water-drive apparatuses of the prior art have several other general disadvantages. One disadvantage stems from the very use of a diverted portion of the irrigation water in the alignment means, said irrigation water being of unpredictable quality at the various irrigation sites. For example, at certain irrigation sites the available water supply contains non-filterable sediments and salts which are apt to corrode or otherwise foul the valves and drive means, thus resulting in unreliable function of the apparatus. Further, the pressure of the irrigation water is difficult to control with preciseness, and is apt to be unpredictably variable, and the variable pressure of the irrigation water makes control of the supports alignment means very difficult and erratic. Also, the exhausting or dumping of water at the drive means onto the ground represents inefficient irrigation practice, to the point of being utterly wasteful.

The open-circuit water-drive apparatuses of the prior art require water supplies having a pressure in excess of 80 p.s.i. in order to accomplish the dual tasks of operating the drive means and of irrigating the land. A great proportion of our nation's fertile, but arid, land area lacks such high pressure water supplies, and accordingly, it has been impossible to make such arid land areas agriculturally productive with said open-circuit water-drive irrigation apparatuses.

It is accordingly the general object of the present invention to overcome the several difficulties and disadvantages of the prior art self-propelled sprinkling irrigation apparatuses.

It is an important general object of the present invention to provide a means for bringing into profitable agricultural production large areas of fertile, yet arid, land having water supplies available at only relatively low 40–75 p.s.i. pressures.

It is a specific object of the present invention to provide for a self-propelled sprinkling irrigation apparatus a drive means for the several supports that is completely independent of the water carried by the water-distributing conduit. It is an ancillary object to provide a drive means that is not affected by quality variations of the irrigation water and that does not waste a portion of the irrigation water through the drive means to the environment.

It is another object of the present invention to provide a drive means for the several supports that is unusually responsive to the springing or bending of the water distributing conduit and that is reliable under widely varying operating conditions.

It is a further object of the present invention to provide a hazard-free and durable non-electrical "safety system" for the irrigation apparatus to prevent deformation or even breaking of the conduit due to some misfunction of the apparatus alignment means. It is an ancillary object to provide a "safety system" that tends to correct minor misfunctions of the alignment means without a complete non-productive shutdown of the apparatus.

With the above and other objects and advantages in view, which will become more apparent as the description proceeds, and especially as pointed out in the appended claims, the invention comprises the novel configuration, combination, and arrangement of parts, as hereinafter described, reference being had to the accompanying drawing wherein like numbers refer to like parts in the several views, and in which:

FIGURE 1 is a diagram, on a considerably reduced scale, of an agricultural field to be sprinkled or irrigated and in which is installed irrigation apparatus constructed in accordance with the present invention.

FIGURE 2 is a front elevational view, on a reduced scale, of the irrigation apparatus comprising a water distributing conduit and the several supports therefor.

FIGURE 3 is a sectional elevational view taken along line 3—3 of FIGURE 2 showing the water distributing conduit and the more prominent features of a typical support therefor.

FIGURE 4 is a schematic plan view of the closed-circuit hydraulic network that is a component of the alignment means for the several support members.

FIGURE 5 is a detail view of the lower portion of FIGURE 3.

FIGURE 6 is a sectional plan view taken along line 6—6 of FIGURE 5 showing the three-way valve component and the slidable actuation or responsive means therefor.

FIGURE 7 is a sectional plan view similar to that of FIGURE 6 wherein a "snap action" valve component is alternatively employed.

The technological area to which this invention relates is generally explained in FIGURES 1–3. Self-propelled sprinkling irrigation apparatuses are normally comprised of relatively long water distributing conduit C having a length substantially equivalent to one-half the length of the rectangular agricultural field or plot F to be irrigated, and accordingly, in the typical case of 160 acre rectangular fields, the length of conduit C is about 1320 feet. Elongate conduit C is connected at the center of rectangular field F to a central water-supply pipe P. When rotated around the central water-supply pipe P, the outer end of water distributing conduit C will traverse a circular path about pipe P, such as around circle G, to spray water onto all the land enclosed within circle G, the water being sprayed from a plurality of nozzles N (shown in FIGURE 3) spaced at intervals along conduit C. The central water-supply pipe P may be supplied from a well or other source of relatively sediment-free water under either natural pressure, e.g. artesian, or artificial pressure e.g. mechanical pump.

There is a plurality of supports S spaced at substantially regular intervals along conduit C to elevate said conduit C above and in substantial parallelism with agricultural field F. The several supports S are numbered sequentially starting at S1 nearest to the central pipe P until the outermost support SN is reached. There are drive means D at each support S to cause the conduit C to move laterally, i.e. to move around central water-supply pipe P. For example, as indicated in FIGURES 3 and 5, drive means D act upon the forward wheel WR and the rearward wheel WF of the several supports S, e.g. the typical A-shaped support S2. The several drive means D are also numbered sequentially starting with D1 located on support S1 and ending with drive means DN located on outermost support SN; for example, in FIGURE 3 drive means D2 is located on support S2.

It is a universally recognized requirement of the self-propelled sprinkling irrigation apparatus art that the several supports S must be maintained in substantially alignment so as to prevent buckling or breaking of water-distributing conduit C. The present invention is primarily concerned with the alignment means, which is described generally in the FIGURE 4 schematic view.

As can be seen in the FIGURE 4 schematic view, the alignment means of the present invention comprises a closed-circuit hydraulic system having a pair of tubular hydraulic mains 11 and 12, each hydraulic main line extending substantially the full length of conduit C, yet both mains are completely isolated and independent from the water carried by conduit C. Thus, the several drive means D are actuatable with a recirculatable oleaginous or other hydraulic fluid that is of consistent quality, pressure, and chemical purity, and the several hydraulically-actuable driven means D are not affected by unpredictable and variable quality of water supplies likely to be encountered. There is a pump means 13, preferably adjacent to supply pipe P, for introducing hydraulic fluid from reservoir 14 into input main 11. Tubular mains 11 and 12 are interconnected near outermost support SN, and accordingly, there exists a closed hydraulic circuit between pump 13; reservoir 14, input main 11, return main 12, and back to pump 13. Pump 13 is driven by a power source 15 which may be taken from the water pump previously alluded to or as a separate electric motor specifically devoted to pump 13.

The closed-circuit hydraulic network includes at each of the several supports, except at outermost support SN, a three-way fluid valve 20 connected in series along input main 11. As shown in FIGURES 4–7, and especially in FIGURE 6, the respective three-way valves 20 comprise an external cylindrical shell 21 which is removably attached to horizontal shelf H of a support member, e.g. S2, and an internal cylindrical plunger member 22 having a circumferentially grooved portion 23 and having an integral axial spindle portion 24 that extends outwardly of shell 21. An external force acting along the length of spindle 24 in the alternating axial directions, as by means of arm 50, will cause the circumferentially grooved plunger 22 and integral spindle 24 to reciprocate back and forth within shell 21 to the axial limits indicated in phantom and solid lines in FIGURE 6. Shell 21 of valve 20 includes an inlet orifice 26 for introduction of hydraulic fluid from input main 11, said inlet orifice 26 being located within the axial limits of circumferential groove 23 irrespective of the degree of movement for plunger 22 within the limits indicated in solid and phantom line in FIGURE 6. Accordingly, inlet orifice 26 is always in alignment with grooved portion 23 as plunger 22 reciprocates back and forth, and plunger 22 does not impede the hydraulic fluid flow from input main 11 into valve 20. Shell 21 of valve 20 also includes an outlet orifice 25 for the continuation of input main 11, said outlet orifice 25 being closeable by a non-grooved i.e. full-bodied, portion of plunger 22. Shell 21 further includes a diversion port 27 for introduction of hydraulic fluid into secondary branch line 16 that leads to hydraulically-actuatable drive means D2, said diversion port 27 being closeable by non-grooved portion 29 of plunger 22. The degree of restriction for the outlet orifice 25 and for diversion port 27 by the non-grooved portions of plunger 22 are preferably substantially equal as said plunger 22 reciprocates. Thus, as plunger 22 moves to its rightward limit of travel (as indicated in solid line in FIGURE 6), diversion port 27 for secondary branch 16 is closed by plunger non-grooved portion 29 and hydraulic fluid flows wholly along input main 11 via orifices 26 and 25 rather than to actuate the drive means e.g. D2. Conversely, as plunger 22 moves leftwardly (as indicated in phantom line in FIGURE 6) the outlet orifice 25 and the diversion port 27 may be partially restricted by the non-grooved portion of plunger 22 by substantially like amounts, and only a portion of the whole hydraulic fluid flow introduced at 26 continues through main 11 at 25, the remaining flow being diverted through port 27 and line 16 to actuate the adjacent drive means e.g. D2. For reasons to be explained later in greater detail, the fluid flow capacity for branch line 16 is preferably markedly less than that for main line 11, less than a 1/2 ratio and more desirably on the order of a 1/5 ratio.

Thus, when plunger 22 is at its rightward position of FIGURE 6, hydraulic fluid flows from input main 11, into inlet orifice 26, through spindle grooved portion 23, out valve outlet orifice 25, back to input main 11, and thence on to the next outward support member, e.g. S3. Conversely, when plunger 22 moves leftwardly, hydraulic fluid flows from input main 11 via inlet orifice 26, through spindle grooved portion 23, out both orifice 25 and diversion port 27; that fluid from outlet orifice 25 is directed to main line 11 while that fluid from diversion port 27 proceeds along secondary tubular branch 16 to the drive means, e.g. D2, and from the drive means back to return main 12. Thus, as indicated in FIGURE 4, each support member, with the exception of outermost support SN, has a valve 20, and each support also includes a drive means D. The hydraulic network generally proceeds from pump 13, to main line 11, which has a three-way valve 20 connected in series therealong at the several supports S except for support SN, and back to pump 13 via return main line 12. At any one of the supports S provided with three-way valve 20, a portion of the hydraulic fluid may be diverted along secondary tubular branch 16 to the hydraulically-actuated drive means and thence directly to return main 12.

FIGURE 5, representing the lower portion of typical support member S2, illustrates especially the three-way valve 20 in conjunction with the secondary hydraulic line 16 proceeding from valve 20 to typically representative drive means D2 and thence back to return main 12. The support members S are of a generally A-shaped configuration in a direction normal to conduit C and comprise convergent upright members U that are reinforced by transverse cross members TH and TL attached at intervals along upright U. Water distributing conduit C rests upon an upper cross member TH and is additionally supported by suspension cables Y extending between said conduit C and the upper apex end V of support S. Valve 20 is attached to a horizontal shelf portion H of support S. The input and return hydraulic mains 11 and 12 extend along the substantial entire length of conduit C, and input main 11 is interrupted at each support S (except at support SN) by valve 20 disposed in series therewith. Secondary tubular branch 16 extends from closeable diversion port 27 to hydraulically-actuatable drive means, e.g. D2, and thence back to return main 12. Drive means D2, which is preferably a double-action hydraulically-actuated piston, may be attached to lower cross-member TL of supports S.

The hydraulically-actuatable drive means D may operate as follows through the rotatable wheel bases Wf and WR of the several supports S to cause said supports and conduit C to move around central supply pipe P. The piston component 31 of drive means D is attached, as by means of connecting block 32, to an elongate driving bar 33 which is reciprocated in accordance with the movement imparted thereto by hydraulic piston 31. Driving bar 33 is disposed immediately above rotatable wheel bases WF and WR, said wheels being provided with integral radially-extending cogs 34. Driving bar 33 includes near the forward and rearward ends thereof, adjacent to forward wheel WF and to rearward wheel WR respectively, a pair of downwardly extending angular teeth 35 to engage a cog 34 of wheels WF and WR during each alternate movement of bar 33 toward forward wheel WF. Accordingly, on said alternate movements of driving bar 33, wheels WF and WR move forwardly a finite distance equal to the spacing of cogs 34. Attached to support uprights U are angular teeth 36, similar to teeth 35, to prevent rearward movement of wheels WF and WR during intervening strokes of driving bar 33 toward rearward wheel WR, wheels WF and WR being stopped during said intervening strokes. The number of reciprocations of piston 33 at each support S, and hence, the degree of forward travel of the support and associated conduit C is proportional to the amount of hydraulic fluid directed to the piston 33 from the diversion port 27 of three-way valve 20 on the same support. The diversion of hydraulic fluid from diversion port 27 to the drive means is controlled by a lever arm 50 that is responsive to the springing or bending of conduit C as one of the supports S gets out of alignment with the remaining supports.

As can best be seen in FIGURE 6, lever arm 50 is attached to conduit C, preferably adjacent to the couplings 38 for consecutive conduit segments. The laterally extending lever arm is at a fixed angle to conduit C and of course remains at said fixed angle during the bending or springing of conduit C as indicated in phantom line in FIGURE 6. Before springing or bending of conduit C takes place, valve plunger 22 is toward its rightward limit wherein port 27 is closed, and hydraulic fluid flows through orifices 25 and 26; thus, at this condition the support, e.g. S2 remains stationary. However, when the support gets rearwardly behind the other supports, there is the bending of conduit C as indicated in phantom line, together with leftward movement of lever arm 50 and plunger 22 to at least partially open port 27; thus, hydraulic fluid is directed through port 27 and secondary branch 16 to piston 31 which causes the lagging support to move forwardly until it reassumes an aligned position where the conduit bending stress is relieved.

With common prior art devices the several supports do include a valve means which is responsively connected to the conduit C, and a portion of the water from conduit C is directed through the valve means to the support's drive means; springing or bending of conduit C actuates the valve means. In such common prior art devices, the means responsive to the springing or bending of the conduit C, e.g. lever arm 50, is customarily attached in fixed relationship to the valve means, and accordingly, the rate of fluid flow through the valve means to the drive means is continuously-variable from one rate to the next rate. With such continuously-variable fluid rate change to the drive means, a non-aligned support S does not tend to resume alignment with the remaining supports with sufficient rapidity, with the result that the conduit C assumes an undesirable sinuous configuration along the length thereof. However, as pointed out in the succeeding paragraphs, the valve means 20 of the present invention may be so associated with the responsive means, e.g. lever arm 50, that the rate of fluid flow to the drive means D may be discontinuously varied, as from zero to some finite rate, so as to provide relatively rapid realignment for a non-aligned support member S.

One type of association between the responsive means 50 and the valve means 20 is the slidable connection between responsive lever arm 50 and valve plunger 22 shown in FIGURE 6. Lever arm 50 has a transversely slotted portion 51 which surrounds plunger spindle 24, and accordingly, arm 50 is slidably disposed along spindle 24. Spindle 24 is integrally provided with a pair of collars at a fixed spacing therealong including first collar 52 and a second collar 53, and lever arm 50 is free to slide along spindle 24 between collars 52 and 53. During springing or bending of conduit C, lever arm 50 slides freely along spindle 24 until a collar 52 or 53 is reached, and during such slidable movement of lever arm 50 between 52 and 53 no change in position of valve plunger 22 occurs. However, when lever arm 50 bears against a collar 52 or 53, there is an abrupt change in the position of valve plunger 22 toward that spindle collar contacted by arm 50. For example, as indicated in phantom line in FIGURE 6 respecting elements C, 50, 53, 24, and 22, a leftward movement of plunger 22 at least partially opens port 27 and abruptly changes the rate of hydraulic fluid flow to the drive means e.g. D2, from practically zero to a finite rate. The surge of hydraulic fluid through port 27 and line 16 initiates rotation of support wheels WF and WR to cause the non-aligned support S to rapidly re-assume an aligned position with the remaining supports so as to promote general alignment of all supports at all times. Further, it has been found desirable to provide a resiliently flexible fitting or coupling 39 between adjacent conduit segments at 38 so as to increase the sensitivity of the responsive means, e.g. lever arm 50. In fact, movement of lever arm 50 appears to be effected primarily by the distortions of flexible coupling 39.

FIGURE 7 illustrates yet another manner for associating the means responsive to the springing or bending of conduit C to the valve means 20 so as to result in desirable abrupt changes in the rate of hydraulic fluid flow to the support's drive means. The spindle 24 of valve plunger 20 is provided with axial slot 54. Toggle link 55 is slidably engaged along spindle slot 54, as by means of lug 56 integrally piercing link 55 and extending into slot 54; lug 56 is adapted to slide along slot 54. The rearward end of link 55 is pivotably attached to a fixed bracket 57 which may be attached to support upright member U. The forward portion of link 55 is pivotably attached to the transverse portion 59 of an L-shaped lever arm 50L, said lever arm 50L being attached to conduit C similarly as for lever arm 50. A compression spring 60 is attached between the forward end of link 55 and an upright post 61, said post 61 being uprightly attached to shelf H. During springing or bending of conduit C, the L-shaped lever arm 50L remains at a fixed angular relationship thereto and moves transversely as indicated in phantom line in FIGURE 7. Upon sufficient transverse movement of lever arm 50L, in accordance with the energization of compression spring 60, spring 60 moves the link 55, the spindle 24, and the valve plunger 22 in abrupt fashion; accordingly, the rate of hydraulic fluid flow through valve 20 to the drive means e.g. D2, is likewise changed abruptly. The abrupt change in fluid flow rate from valve 20 to the drive means D via port 27 and line 16 causes a non-aligned support S to rapidly re-assume an aligned position with the remaining supports so as to promote generalized alignment of all supports S at all times. The resiliently deformable fitting 39 between adjacent conduit segments at 38 may be advantageously employed to increase the sensitivity of the responsive means, e.g. lever arm 50L.

Having now described the structure of the invention, the operation thereof, which has already been alluded to, will now be summarized and described in greater detail. The sprinkling irrigation apparatus is customarily started at a rest position with the several support members S along conduit C being in substantial alignment and with the diversion port 27 of valves 20 being closed by virtue of the linear configuration of conduit C. As pump 13 is actuated, hydraulic fluid from reservoir 14 is caused to flow through input main 11. At every support S the hydraulic fluid flows through inlet orifice 26 and outlet orifice 25 of valve 20 until the final or outermost support SN is reached. Final support SN is devoid of a valve means e.g. 20, and the entire hydraulic fluid is directed to the drive means DN, and the driving bar 33 actuated by piston 31 acts upon support wheels WF and WR causing the support SN to move forwardly, thus causing a springing or bending of conduit C particularly at the next inward support S(N–1). With the springing or bending of conduit C at the next support S(N–1), the responsive means of S(N–1) e.g. 50, 50L, causes axial movement to the plunger 22 of valve means 20 sufficient to at least partially open closeable port 27; thus at least a portion of the hydraulic fluid through valve 20 flows through diversion port 27 through secondary branch 16 to drive means D(N–1) of support S(N–1) and finally into return main 12, completely bypassing DN of SN. Accordingly, final support SN slows down because at least a portion of the hydraulic fluid never reaches DN, but is diverted to drive means D(N–1). The resultant concurrent slowing down of support SN and the moving forward of support S(N–1) causes supports SN and S(N–1) to be brought into alignment, forwardly of the remaining inward supports. Consequently, the springing or bending of conduit C is relieved at support S(N–1), and diversion port 27 of valve 20 at support S(N–1) recloses, and the relatively forward positions of supports SN and S(N–1) effectively translates the springing or bending of conduit C to support S(N–2). The process described in the preceding four sentences is repeated for each succeeding inward support in consecutive order and finally to innermost support S1 when the cycle is completed with all supports S in virtual alignment forwardly of the original rest position. Immediately upon completion of the first cycle, the second cycle in like manner begins at outward support SN.

The operation of the hydraulic system described in the previous paragraph also provides an inherent "safety means" to prevent deformation or even breaking of the water distributing conduit C due to some malfunction of the hydraulic system. For example, if one of the supports S runs too far ahead, as in the case of downwardly and forwardly sloping terrain, the resultant inverse springing or bending of conduit C is sensed by the responsive means, e.g. 50, 50L, and the closeable valve port 27 at the errant support is fully closed until the remaining supports are brought into alignment therewith. On the other hand, if one of the supports runs too far behind, as in the case when wheels WF and WR are mired in wet earth, the severe movement of the responsive means closes outlet orifice 25 completely, and all of the hydraulic fluid flow at the lagging support is diverted to the drive means in an attempt to provide sufficient power to the lagging support's wheels. If this attempt should unsuccessful, there is a marked pressure build-up in input line 11 since the secondary branches 16 have a much lower fluid-carrying capacity than do main lines 11 and 12, and this pressure build-up is registered on pressure gage 90 which is connected into main line 11. Pressure gage 90 is electrically connected to an automatic control box 91 for pump power source 15, and preselected high pressures of gage 90 will electrically shut-off power source 5. If the electrical shut-off switch of pressure gage 90 should fail, there is a pressure-relief valve 92 of last resort to bleed the hydraulic fluid and prevent deformation or breaking of conduit C. In the case of pressure drops due to hydraulic fluid leakage from the hydraulic system, this leakage as pressure drop is indicated on pressure gage 90, and pre-selected low pressures will actuate an electrical switch in gage 90 to also shut off power source 15.

One type of hydraulic fluid used is S.A.E. #5 low-viscosity non-detergent non-foaming oil. The hydraulic mains 11 and 12, each of about 1300 feet length, comprise nominal ½ inch diameter pipe having a circular opening area of about 0.30 square inch. Said S.A.E. #5 oil will flow well through said nominal ½ inch lines at temperatures above 40° F.

It can be seen that the closed-circuit hydraulic drive system comprising generally elements 11–16 is completely independent of the irrigation water carried by conduit C. Since no portion of the conduit water is taken therefrom for actuating the drive means, excessive water pressures are not required and relatively low water pressures of approximately 40–75 p.s.i. are adequate for the spraying of water as through nozzles N.

From the foregoing, the construction and operation of the self-propelled sprinkling irrigation apparatus is believed to be apparent to one having ordinary skill in the art. While but a few illustrative examples of the invention have been disclosed, it is not desired to limit the invention to the precise embodiments shown since it is apparent that changes in the construction may be made within the scope of the appended claims without departing from the spirit of the invention.

We claim:
1. In a sprinkling and irrigating apparatus for a relatively large section of land or the like which includes a central water supply pipe, a water distributing conduit pivotably connected to said central supply pipe nearer to the conduit inward end than to the conduit outward end, said conduit being movable around said supply pipe as an axis, a plurality of supports disposed at spaced positions along said distributing conduit, a plurality of discharge nozzles spaced along said water distributing conduit for spraying water onto the land as said conduit moves around the central supply pipe, said distributing conduit being adapted to laterally flex due to temporary misalignment of at least one support member with respect to other support members, drive means at each support for laterally moving the several supports and the associated water conduit around the central supply pipe, and alignment means tending to maintain the several supports in alignment; the improvement wherein said alignment means comprises a closed-circuit hydraulic network independent of the water supply carried by the water distributing conduit, and hydraulically-actuatable drive means, said hydraulic network comprising a pair of tubular hydraulic mains associated along the water distributing conduit and including an input main and a return main, said hydraulic network including pump means for introducing hydraulic fluid into the input main, said pair of tubular hydraulic mains being inter-connected nearer to the conduit outward end than to the conduit inward end whereby when the hydraulic fluid introduced into the input transverses substantially the entire length of the conduit said hydraulic fluid traverses along the return main and ultimately back to the pump means for reintroduction of the hydraulic fluid into the input main, said closed-circuit hydraulic network including at each of several supports a three-way fluid valve connected in series along the input hydraulic main; said three-way fluid valve comprising an inlet orifice and an outlet orifice for the introduction and exhaust respectively of hydraulic fluid from said input main through the three-way valve; said three-way valve also including a closeable diversion port and a secondary tubular branch extending from said diversion port to a hydraulically-actuatable drive means of the same support member and thence from the drive means to the return main line, said drive means being actuated in direct relationship to the amount of hydraulic fluid flowing through the secondary branch at a given support member; and means responsive to lateral flexing along the water distributing conduit at said given support due to temporary misalignment of said given support with respect to other support members; and means associating said responsive means with said three-way valve so as to control the amount of hydraulic fluid flow through said secondary branch.

2. The sprinkling and irrigating apparatus of claim 1 wherein the theree-way hydraulic fluid valve includes a circumferentially grooved plunger member disposed internally of the valve shell, and wherein the plunger member controls the amount of hydraulic fluid flowing through the outlet orifice and through the diversion port.

3. The sprinkling and irrigating apparatus of claim 2 wherein the non-grooved portion of the plunger member controls the amount of hydraulic fluid flowing through the outlet orifice and through the diversion port, said plunger member including an integral axial spindle that extends externally of the valve shell; and wherein the responsive means is associated with the plunger spindle so as to abruptly change the amount of fluid flowing through the valve diversion port from zero to a finite rate.

4. The sprinkling and irrigating apparatus of claim 3 wherein the responsive means includes a laterally extending lever arm attached to the water distributing conduit, said laterally extending lever arm being transversely slotted therethrough nearer to the outward end thereof, said lever arm slotted portion slidably surrounding the plunger member spindle along the axial length of said spindle; and wherein the plunger member spindle includes a pair of integral collars along the length thereof on both sides of the transversely slotted lever arm whereby as said lever arm bears against that collar remote of the valve shell there is an abrupt change in the amount of fluid flowing through the valve diversion port from zero to a finite rate.

5. The sprinkling and irrigating apparatus of claim 4 wherein the fluid carrying capacity for the secondary tubular branch line leading from the diversion port is less than ½ that for the input main line; and wherein the input main line includes a pressure-indicating gauge therealong, said pressure indicating gauge communicating with the pump means so as to stop said pump means when the major portion of the hydraulic fluid flow is diverted to a secondary branch line from the input main line.

6. The sprinkling and irrigating apparatus of claim 3 wherein the responsive means includes a laterally extending lever arm attached to the water distributing conduit, said lever arm being slidably attached to an axially slotted portion of the plunger member spindle with a toggle link, said toggle link having a free end that is attached to the support member through an energized spring that causes abrupt changes in axial position of the valve plunger and also an abrupt change in the amount of fluid flowing through the valve diversion port from zero to a finite rate whereby the drive means causes an abrupt change in motion of the support member from zero to a finite rate of speed.

7. The sprinkling and irrigating apparatus of claim 1 wherein the fluid carrying capacity of the secondary tubular branch line leading from the diversion port to the drive means is less than ½ that for the input main line; and wherein the input main line includes a pressure-indicating gauge therealong, said pressure-indicating gauge communicating with the pump means so as to stop said pump means when the major portion of the hydraulic fluid delivered by the pump means is diverted to a secondary branch line from the input main line.

8. The sprinkling and irrigating apparatus of claim 7 wherein the three-way hydraulic fluid valve includes a circumferentially grooved plunger member disposed internally of the valve shell, said plunger member controlling the amount of hydraulic fluid flowing through the outlet orifice and through the diversion port, said plunger member including an integral spindle that extends externally of the valve shell; and wherein the responsive means is operatively associated with the plunger spindle so as to abruptly change the amount of fluid flowing through the valve diversion port from zero to a finite rate.

9. The sprinkling and irrigating apparatus of claim 1 wherein the water distributing conduit comprises a plurality of elongate segments connected together sequentially with resiliently deformable couplings; wherein the responsive means is attached to an elongate conduit segment adjacent to the resiliently deformable coupling; and wherein the responsive means is operatively associated with the valve so as to abruptly change the amount of fluid flowing through the valve diversion port from zero to a finite rate.

10. The sprinkling and irrigating apparatus of claim 9 wherein the responsive means includes a laterally extending lever arm attached to the water distributing conduit, said laterally extending lever arm being transversely slotted therethrough; wherein the three-way hydraulic fluid valve includes a circumferentially grooved plunger member disposed internally of the valve shell for controlling the amount of hydraulic fluid flowing through the outlet orifice and through the diversion port, said plunger member including an integral axial spindle that is provided with a pair of integral collars along the axial length thereof, said lever arm slotted portion slidably surrounding the valve spindle between said integral collars whereby said lever arm bears against that collar more remote of the valve shell there is an abrupt change in the amount of hydraulic fluid flowing through the valve diversion port from zero to a finite rate; wherein the fluid carrying capacity for the secondary tubular branch leading from the valve diversion port is less than ½ that for the input main line; and wherein the input main line includes a pressure-indicating gauge therealong, said pressure-indicating gauge communicating with the pump means so as to stop said pump means when the major portion of the hydraulic fluid flow is diverted to a secondary branch line from the input main line.

References Cited

UNITED STATES PATENTS

| | | | |
|---|---|---|---|
| Re. 26,285 | 10/1967 | Stafford | 239—212 |
| 1,419,925 | 6/1922 | Heine | 239—177 |
| 2,604,359 | 7/1952 | Zybach | 239—177 |
| 2,893,643 | 7/1959 | Gordon | 239—177 |
| 2,940,672 | 6/1960 | Gaskell | 239—212 |
| 3,001,721 | 9/1961 | Zybach | 239—177 |
| 3,246,848 | 4/1966 | Bowers | 239—212 |

EVERETT W. KIRBY, *Primary Examiner.*